United States Patent [19]

Higgins et al.

[11] Patent Number: 5,290,995
[45] Date of Patent: Mar. 1, 1994

[54] PLASMA ARC CUTTING SYSTEM HAVING FLUID METERING AND POWER CONTROL SYSTEMS

[75] Inventors: Philip K. Higgins, Society Hill; Peter Budai; Wayne S. Severance, Jr., both of Florence, all of S.C.

[73] Assignee: ESAB Welding Products, Inc., Florence, S.C.

[21] Appl. No.: 811,837

[22] Filed: Dec. 20, 1991

[51] Int. Cl.$^5$ .................... B23K 9/00; B23K 10/00
[52] U.S. Cl. .................... 219/121.44; 219/121.54; 219/121.55; 219/121.57; 219/121.48; 219/75; 219/121.59
[58] Field of Search .............. 219/121.54, 121.55, 219/121.56, 121.57, 121.59, 121.39, 121.48, 121.55, 75

[56] References Cited
U.S. PATENT DOCUMENTS

| | | | |
|---|---|---|---|
| 3,943,699 | 3/1976 | Thommes | 219/121.57 |
| 3,949,188 | 4/1976 | Tateno | 219/121.55 |
| 3,988,566 | 10/1976 | Vogts et al. | 219/121.55 |
| 4,156,125 | 5/1979 | Brown | 219/121.54 |
| 4,175,225 | 11/1979 | Holko et al. | 219/121.55 |
| 5,017,752 | 5/1991 | Severance, Jr. et al. | 219/121.59 |
| 5,036,176 | 7/1991 | Yamaguchi et al. | 219/121.44 |
| 5,170,033 | 8/1992 | Couch, Jr. et al. | 219/121.51 |

*Primary Examiner*—Mark H. Paschall
*Attorney, Agent, or Firm*—Bell, Seltzer, Park & Gibson

[57] ABSTRACT

A cutting and welding system is disclosed which includes a metering system for controlling at a location remote from the plasma arc torch the amount of gas and water fed to the plasma arc torch. The system includes at least one torch having an electrode, a nozzle assembly positioned adjacent the discharge end of the electrode, and structure for generating a flow of gas between the electrode and the nozzle assembly to create plasma flow through the bore to a workpiece. A gas line communicates with a source of gas and the plasma arc torch for supplying gas to the torch. A plurality of metering orifices are positioned within the gas flow line in a parallel bank with each other so that the gas may flow through each of the metering orifices. Each metering orifice has a predetermined diameter opening. A gas control valve is mounted adjacent each of the metering orifices within the gas flow line on the upstream side toward the supply of gas. Each gas control valve is operable between open and closed positions for allowing gas flow through a metering orifice upon actuation of the valve. Control means selectively actuates the gas control valves to control gas flow through selected metering orifices to allow a predetermined amount of gas to flow to the plasma arc torch. A method of controlling the cutting current generated to the torch also is disclosed.

46 Claims, 5 Drawing Sheets

PLASMA ARC CUTTING SYSTEM HAVING FLUID METERING AND POWER CONTROL SYSTEMS

FIELD OF THE INVENTION

This invention relates to a cutting and welding system having at least one plasma arc cutting and welding torch, and a metering system for controlling at a location remote from the plasma arc torch the amount of gas and water fed to the plasma arc torch. Additionally, this invention relates to a cutting and welding system having at least one plasma arc torch and a method of controlling the cutting current fed to the torch.

BACKGROUND OF THE INVENTION

In a conventional cutting and welding system, plasma arc torches are supported on a frame bridge and carriage system. Drive means moves the plasma arc torches along the X - Y - Z axis during the cutting or welding of a workpiece positioned beneath the torch. A microprocessor controller, which usually includes a numerical control operating system, provides precise control over the position, movement, and acceleration of the torch to enable precision cutting and welding of the workpiece.

The plasma arc torches used in such systems usually are water assisted, although in some systems, the torches include an annular gas sheath generated around the discharged plasma instead of the usual annular jet of water. The torches also include water cooling circuits to prevent the torch from overheating during operation.

During system operation, a power supply generates a cutting current to the torch electrode, and generates an electrical arc extending from the electrode through a bore of the nozzle assembly of the torch into contact with the workpiece positioned beneath the nozzle assembly. A flow of cutting gas is generated between the electrode and the nozzle assembly, and the gas contacts the electrical arc to form a plasma flow through the bore.

During initial setup for system operation, the system operator presets the amount of cutting current and the amount of gas and water flow into the torch. The operator then manually adjusts the cutting current to accommodate load changes which occur through process parameter changes such as changes in plate thickness, changes in plasma gas flow, changes in the distance from the plate to the torch, and changes in the gas and water flows into the torch. In this system, each plasma arc torch includes a separate control for manually varying the cutting current and the gas and water flow into the plasma arc torch. A unitary control for several torches is not advantageous because of the inherent difficulty in balancing the gas, water and power between the different torches.

In many conventional systems, the water, gas and power controls are manually operated during system operation to enable the operator to set the flows and cutting currents on an as-needed basis. The controls usually are efficient and simple in design to reduce the overall cost of the system. In one conventional cutting and welding system marketed as a CM-300 Gantry Shape Cutting Machine, manufactured by ESAB Welding Products, Inc. of Florence, S.C., the gas and water pass through conventional rotameters and valve mechanisms associated with the rotameters. The operator visually measures the flow by reading indicia positioned on the side of the tapered measuring tubes common to the rotameters. The valves are adjusted accordingly.

The rotameters and the valves are usually positioned closely adjacent the torches. In one system, the tubes and valves are positioned in a flow control box mounted on the frame supporting the torches so that the tubes and valves move with the torches during cutting or welding, making manual adjustment of the gas and water flows during system operation difficult.

A more complex valve mechanism could be substituted for the conventional rotameters and valves. For example, a closed loop control system could be used for measuring water and gas output and complex valve mechanisms then could be adjusted for varying flow through the valves. However, such valves are complex and expensive, and require sophisticated control and software technology, making their use in a plasma arc torch welding and cutting system prohibitive.

In such manual water flow control systems, standard flow control valves also are positioned adjacent the water pumps to provide on-off control of water flowing into the torch. Typically, the valves are electrically actuated, and after extended use, the valves may become stuck in an open or closed position. If the torch is operated with a closed valve, the torch may overheat. Thus, operators often electrically bypass the flow control valve when the valve is open, hoping that the valve remains in the open position. If the valve closes, and the operator starts system operation under the belief that the valve is open, then the plasma arc torch will overheat, resulting in a damaged torch.

Additionally, in such cutting systems, a power supply provides a cutting current to the electrode to create a plasma flow through the bore to a workpiece positioned beneath the nozzle assembly. In one common power supply manufactured by ESAB Welding Products, Inc. of Florence, S.C., under the Serial designation ESP-400, the cutting current of this system is precisely regulated by an analog reference voltage signal.

The cutting current is a linear function of the analog reference voltage signal. The analog signal is adjusted by manually turning a small control knob, which varies the analog signal and varies the cutting current. During some cutting and welding operations, process parameters such as the thickness of the plate, the distance from the nozzle to the plate, and the operating temperature may change. As a result, the cutting current may vary as the process parameters change, and the operator must adjust the control knob to maintain a constant current output to the torch. Constant operator adjustment may result in some operator error, and the loss of cut or weld quality.

SUMMARY OF THE INVENTION

It is therefore an object of the present invention to provide a plasma arc cutting and welding system in which the gas generated between the electrode and the nozzle assembly to a create plasma flow is metered and controlled from a location remote from the plasma arc torch without complex mechanical and feedback control apparatus.

It is another object of the present invention to provide a plasma arc cutting and welding system in which the flows of water and gas in water assisted plasma arc torches are metered and controlled from a location remote from the plasma arc torch without complex mechanical and feedback control apparatus.

It is another object of the present invention to provide a plasma arc cutting and welding system in which the rotameter and valve mechanisms commonly used on such systems are replaced with mechanically simple control mechanisms which can be automatically and remotely controlled without operator assistance.

It is another object of the present invention to provide a method for controlling starting of a plasma arc cutting and welding system in which flow control valves are tested to ensure an open condition to prevent torch overheating caused by lack of water flow.

It is another object of the present invention to provide a method for controlling the current generated to a plasma arc torch in a cutting and welding system in which the power supply has an analog voltage control signal controlling current output to the torch and in which the voltage signal is automatically varied without operator assistance in response to changed cutting current conditions to maintain a constant cutting current.

In accordance with the present invention, a cutting and welding system provides for a plurality of metering orifices positioned within gas flow lines communicating with the source of gas and the plasma arc torch. The metering orifices are positioned in a parallel bank with each other, and each metering orifice has a predetermined diameter opening. Gas control valves, preferably solenoid valves, provide off-on control of gas flow through the metering orifices. Control means in the preferred form of a microprocessor is operatively connected to the gas control valves for actuating selected gas control valves. In the system of the invention, the amount of gas flowing to the plasma arc torch may be accurately controlled by actuating selected gas control valves to allow gas flow through selected metering orifices of a desired size.

In the preferred embodiment, the system includes at least one water assisted plasma arc cutting and welding torch. The torch includes an electrode having an arc discharge end and a nozzle assembly positioned adjacent the discharge end of the electrode. The nozzle assembly includes a bore extending through the nozzle. A power supply generates within the electrode an electrical arc which extends from the electrode and through the bore to a workpiece located adjacent the nozzle assembly. A flow of gas is generated between the electrode and the nozzle assembly to create a plasma flow through the bore to a workpiece positioned beneath the nozzle assembly. An annular jet of fluid is generated outward from the nozzle to envelope the plasma as it is discharged from the nozzle. In the preferred embodiment, the annular jet of fluid is water. In another embodiment, the jet of fluid may be a gas.

The system includes a frame, rail and carriage system which supports the torch in spaced relation above the workpiece. The carriage moves the torch along the frame for welding or cutting of the workpiece along a predetermined path of travel. Gas and water supply lines provide water and gas to the plasma arc torch.

A plurality of metering orifices are positioned within respective gas and water supply lines in a parallel bank with each other so that the gas and water may flow through respective metering orifices. Each metering orifice has a predetermined diameter opening. Respective gas and water control valves are mounted adjacent each of the metering orifices within the gas and water lines on the upstream side toward respective supplies of water and gas. Each control valve has opened and closed positions for allowing water or gas flow through respective metering orifices upon actuation of the control valves into an open position. Control means is operatively connected to the control valves for actuating selected control valves to meter a predetermined amount of water and gas through selected metering orifices of a desired size.

Because water is not compressible, the water line includes a back pressure regulator and an upstream pressure regulator for controlling the upstream and downstream pressures across the metering orifices. A flowmeter is positioned between the bank of metering orifices and the back pressure regulator for measuring the flow of water. An operator may read the flow meter and adjust the backpressure regulator to obtain a desired pressure differential across the metering orifices.

In the preferred embodiment, the source of cutting gas includes a source of nonoxidizing gas and a source of oxidizing gas. In the preferred embodiment, the nonoxidizing gas is nitrogen and the oxidizing gas is oxygen. The gas line to each torch includes a common header interconnecting the nonoxidizing and oxidizing gas sources with the gas control valves and metering orifices. A starting gas line branches from the nonoxidizing gas source to the plasma arc torch for supplying a starting flow of nonoxidizing gas. A metering orifice and starting gas control valve are positioned within the starting gas flow line. The starting gas control valve is operatively connected to the control means for selecting on-off flow of nonoxidizing starting gas into the torch at predetermined starting times as established by the control means.

The starting gas control valve and associated metering orifice are positioned within a plumbing box on the support frame, bridge or carriage and adjacent to the plasma arc torch. Thus, when the starting gas control valve is initially opened, an undelayed gas flow is initiated into the plasma arc torch. Preferably, the control means operates various valves to initiate a plasma arc starting sequence in which a first flow consisting essentially of a non-oxidizing starting gas is generated, then a second flow of oxidizing cutting gas is generated after the flow of the nonoxidizing gas into the plasma arc torch is terminated.

DETAILED DESCRIPTION OF THE PREFERRED EMBODIMENT

Figure 1:
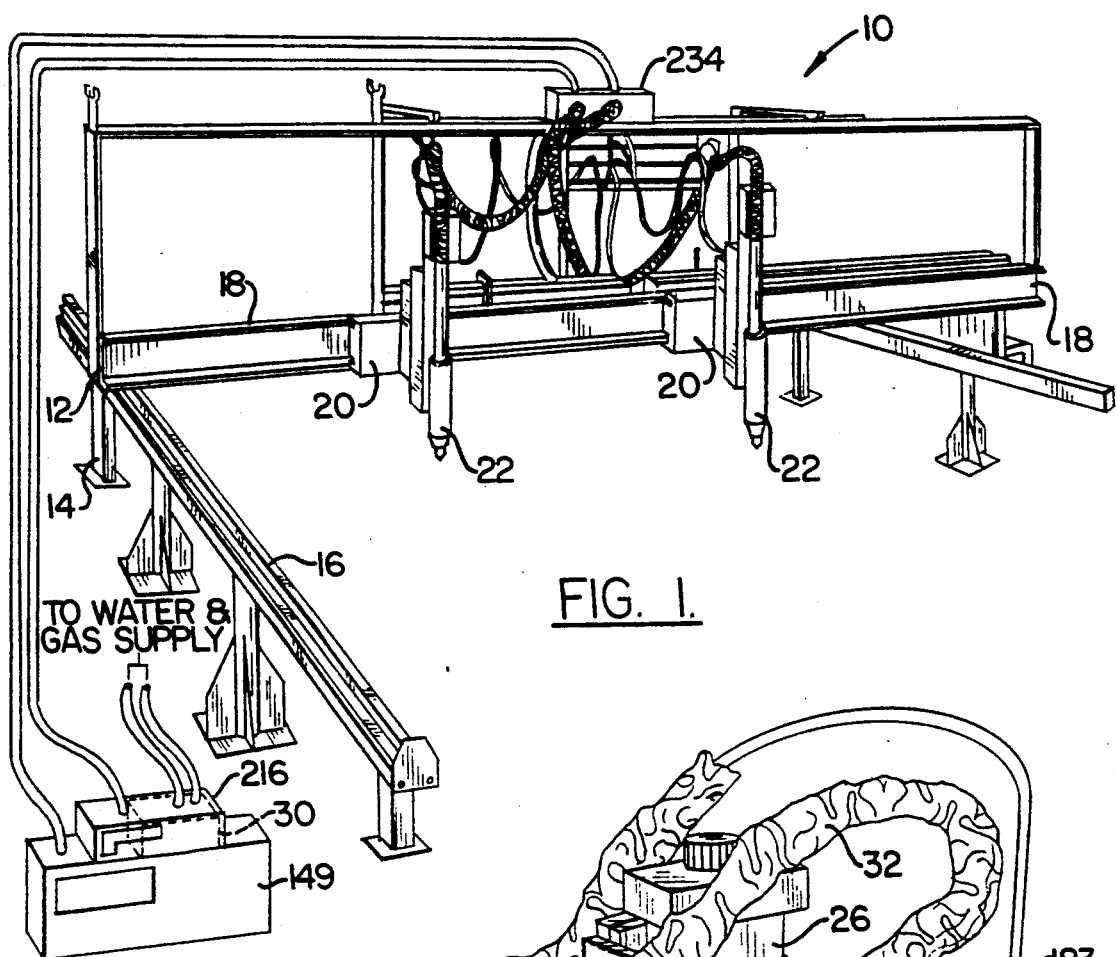
FIG. 1 is an isometric view of a plasma arc torch cutting and welding system.

Referring now to the drawings, and more particularly to FIG. 1, one embodiment of a cutting and welding system of the present invention is indicated generally at 10. The system 10 includes a frame 12 and legs 14 supporting the frame. The frame 12 has rails 16 on which a bridge structure 18 is mounted for movement back and forth along the rails 16. The rails 16 extend longitudinally forming a structure in which a large steel plate can be positioned therebetween for allowing cutting and welding of the steel plate.

An electrical motor and transmission assembly (not shown) drives the bridge 18 longitudinally along the rails 16. Two carriage assemblies 20 are mounted on the bridge 18 and are movable along the width of the bridge 18. A drive motor and transmission assembly (not shown) drives the carriages 20 transversely along the bridge 18 to allow back and forth movement along the width of the bridge 18. In the illustrated embodiment, a plasma arc torch 22 is positioned on each carriage 20 In another embodiment (not illustrated), only one carriage assembly is mounted on the bridge and supports one plasma arc torch.

Figure 2:
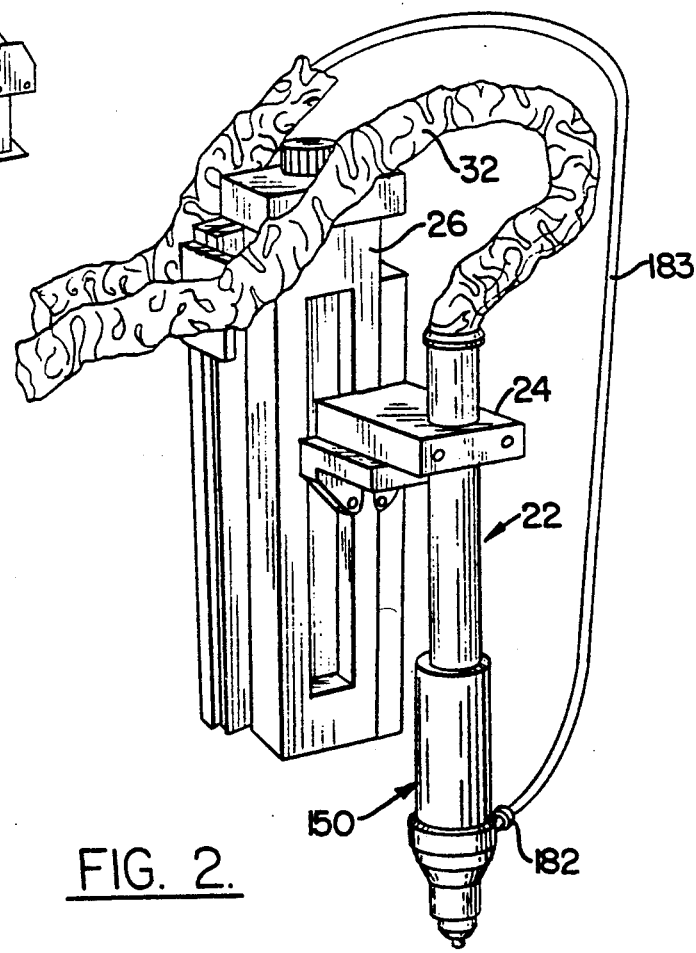
FIG. 2 is an enlarged view of a plasma arc torch and showing the plasma arc torch mounted for movement on the carriage and bridge.

As shown in greater detail in FIG. 2, one means for mounting the plasma arc torch for slidable movement relative to the carriage is illustrated. Although different mounting apparatus could be used, in the illustrated embodiment, the plasma arc torch 22 is mounted in a clamping block 24. A vertical guide column 26 supports the clamping block 24 for vertical slidable movement relative to the guide column 26. The clamping block 24 may be pneumatically actuated to move the clamping block 24 relative to the guide column 26. An air hose (not shown) supplies pneumatic pressure for moving the clamping block 24. The clamping block 24 may include conventional pneumatic controls and drive mechanisms (not shown) for moving the clamping block 24 relative to the guide column 26. During cutting or welding, the clamping block 24 is preset to a predetermined vertical standoff distance from a metal plate positioned between the rails 16.

A control unit 30 is positioned adjacent the frame 12, and is operatively connected to the various motors and transmissions of the system 10. The control unit includes a microprocessor permitting preprogramming of a numerical control system for controlling movement of the torch during cutting and welding. The control unit 30 has an over housing formed from sheet metal and fiberglass. The microprocessor, power supply and various valve and metering components of the invention may be positioned within the outer housing. The electrical power wires and gas and water lines extend as one cable 32 to the torches 20.

Figure 3:
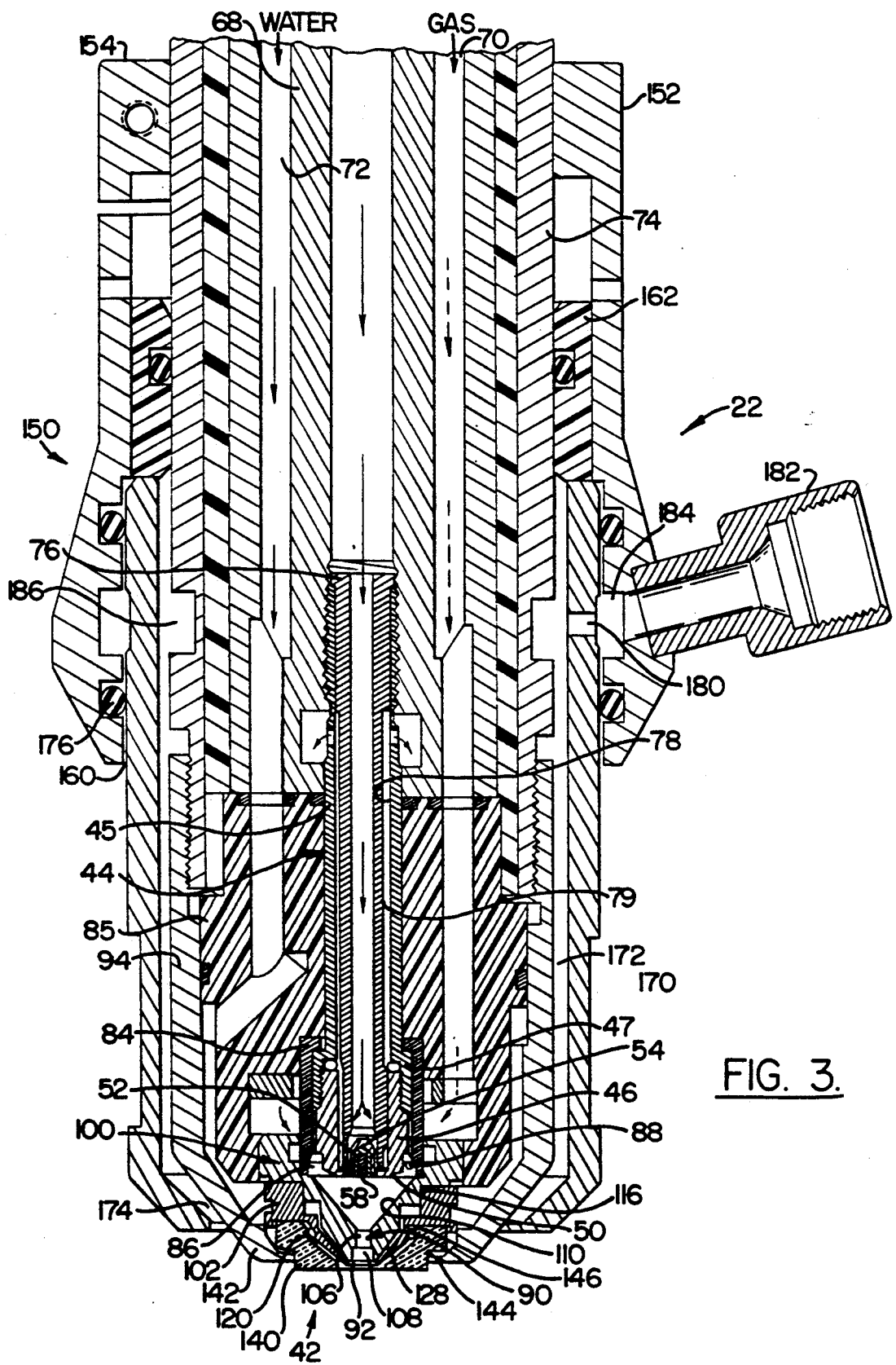
FIG. 3 is a sectional view of one embodiment of the plasma arc torch used in the cutting and welding system of the present invention.

Referring now to FIG. 3, a detailed view of one plasma arc torch 22 used in the welding and cutting system of the present invention is shown in detail. The illustrated torch 22 is commonly used in a cutting and welding system in which the workpiece is positioned under water. The water not only provides a protective shield to the workers against the noise generated during cutting and welding, but also provides a filter to collect the emissions generated during cutting or welding. In the illustrated embodiment, the torch is water assisted, and generates an annular get of water in surrounding relation to the plasma flow. The torch also could be gas-assisted, in which an annular jet of gas, instead of water, is generated in supporting relation to the plasma. When the cutting and welding system 10 is used in underwater operation, an air curtain attachment generates a protective air curtain to protect the plasma and secondary water or gas.

The plasma arc torch 22 includes a nozzle assembly 42 and a tubular electrode 44 defining a longitudinal axis. The electrode 44 is preferably made of copper or a copper alloy, and it is composed of an upper tubular member 45 and a lower member or holder 46. The member 45 also includes an internally threaded lower end portion 47. The holder 46 also is tubular in construction, and includes a lower front end and an upper rear end. A transverse end wall closes the front end of the holder 46. The transverse end wall defines an outer front face 50. The rear end of the holder is externally threaded and is joined to the lower end portion 47 of the upper tubular member.

The holder 46 is open at the rear end so that the holder is cup shaped in configuration and defines an internal cavity 54 which communicates with the front face 50. An insert 58 is mounted in the cavity and is disposed coaxially along the longitudinal axis. The emissive insert 58 is composed of a metallic material having a relatively low work function, preferably in the range of between about 2.7 to about 4.2 ev, to emit electrons upon an electric potential being applied thereto. Suitable examples of such materials are hafnium, zirconium, tungsten and alloys thereof. A relatively non-emissive sleeve 52 is positioned in the cavity 54 coaxially about the emissive insert 58. The sleeve 52 is composed of a metallic material having a work function which is greater than that of the material of the holder, and also greater than that of the material of the emissive insert. Further information concerning the electrode and insert are found in U.S. Pat. No. 5,023,425, issued Jun. 11, 1991, assigned to the present assignee, ESAB Welding Products, Inc. of Florence, S.C., which is hereby incorporated by reference.

In the illustrated embodiment, as shown in FIG. 1, the electrode 44 is mounted in a plasma arc torch body 68, which has gas and liquid passageways 70 and 72. The torch body 68 is surrounded by an outer insulated housing member 74. A tube 76 is suspended within the central bore 78 of the electrode 44 for circulating a liquid medium such as water through the electrode structure 44. The tube has a smaller diameter than the diameter of the bore 78 to provide a space 79 for the water to flow upon discharge from the tube 76. The water flows from a source (not shown), through the tube 76, back through the space 79 to an opening of the torch body, and to a drain hose (not shown). The passageway 72 directs the injection water into the nozzle assembly 42 where it is converted into a swirling vortex for surrounding the plasma arc as will be explained in more detail below.

The gas passageway 70 directs gas from a suitable source (not shown), through a conventional gas baffle 84 of any suitable high temperature ceramic material into a gas plenum chamber 86 via inlet holes 88. The inlet holes 88 are arranged to cause the gas to enter the plenum chamber 86 in a swirling fashion as is well-known. The gas flows out from the plenum chamber 86 through the arc constricting bore 90 and opening 92 of the nozzle assembly 42. When the electrode 44 is connected to the torch body 68, the electrode holds in place the ceramic gas baffle 84 and a high temperature plastic insulating member 85. The member 85 electrically insulates the nozzle assembly 42 from the electrode 44. An outer cup shield 94 is threadedly mounted on the torch body and engages the nozzle assembly 42 to retain the nozzle assembly 42 in position and protect component parts of the nozzle assembly. The outer cup shield 94 is formed of a metallic material such as copper.

The nozzle assembly 42 includes a nozzle base 100 and a lower nozzle member 102. The nozzle base 100 is formed from copper or a copper alloy, and includes a substantially cylindrical body portion. The arc constricting bore 90 extends through the lower end of the nozzle base 100 and is aligned with the longitudinal axis defined by the electrode. The bore 90 includes a first bore section 106 positioned toward the electrode and a second bore section 108 defining the exit end of the bore and having a diameter greater than the diameter of the first bore section. The two bores 106, 108 provide for a more controlled, plasma discharge flow.

The nozzle base 100 includes an interior, chamfered, frusto-conical surface 110 tapering inward toward the bore 90 in a direction away from the electrode. This surface 110 also constricts the arc during torch operation. The nozzle base 100 includes an annular mounting shoulder 116, and an outer, frusto-conical surface 120 tapering downward toward the longitudinal axis in a direction away from the electrode.

The lower nozzle member 102 comprises a cylindrical body portion formed of a metallic material, preferably a free cutting brass. The upper portion of the lower nozzle member includes an annular collar portion dimensioned for an interference fit with the mounting shoulder 116 positioned on the nozzle base 100. The lower nozzle member includes a plasma discharge opening 92 aligned with the longitudinal axis and positioned adjacent the bore (FIG. 2). A tapered, interior surface is spaced from the outer frusto-conical surface 120 of the nozzle base to form a downwardly angled water passage 128 through which water is injected from the water passageway 72 into impinging contact with the plasma.

A ceramic insulator 140 is secured onto the lower nozzle member and extends substantially along the outer surface of the lower nozzle member. The ceramic insulator prevents double arcing and insulates the lower nozzle member from heat and plasma generated during torch operation. The ceramic insulator 140 is held in place by an O-ring 146, which engages a shoulder on the ceramic insulator and the lower nozzle member.

The outer cup shield 94 has a lip 142 at its forward end. The lip 142 engages a shoulder 144 on the ceramic insulator 140 and retains the ceramic insulator, lower nozzle member 102 and nozzle base 102 in position against the ceramic insulator 140.

A power supply 149 (FIG. 5) is connected to the torch electrode in a series-circuit relationship with a metal workpiece, which typically is grounded. In the illustrated embodiment, the power supply is connected in series relation with both plasma arc torches 22. In operation, the plasma arc is established at the emissive insert of the torch 22 and acts as the cathode terminal for the arc. The workpiece is connected to the anode of the power supply and is positioned below the lower nozzle member between the rails 16. The plasma arc is started in conventional manner by momentarily establishing a pilot arc between the electrode 44 and the nozzle assembly 42. The arc then is transferred to the work piece and is ejected through the nozzle bores 106, 108. The arc is intensified, and the swirling vortex of water envelopes the plasma as it passes through the opening.

As shown in FIGS. 2 and 3, the air curtain attachment, indicated generally at 150, allows an evenly formed protective air curtain to be generated for protecting the plasma from water flow into the plasma during underwater cutting. Although the attachment 150 will be described as an addition to the torch, the attachment also could be manufactured integral with the torch during the torch's manufacture.

The attachment 150 includes a cylindrical support body 152 formed preferably from a chromium plated brass. The cylindrical support body 152 includes a split upper portion 154, which forms a clamping collar. A socket head cap screw (not shown) joins both sides of the clamp together to secure the cylindrical body to the outer surface of the torch, and more particularly the insulated housing member 74. The cylindrical support body 152 extends in spaced relation from the torch body outer surface towards the front end defined by the outer cup shield 94, and forms an annular opening 160 at the front end.

An insulating sleeve 162 is positioned between the cylindrical support body 152 and the metallic outer surface for insulating the cylindrical support body 152 from the outer surface of the torch body. The insulating sleeve 162 preferably is formed of a low grade phenolic and the cylindrical support body and the insulating sleeve may be slid onto the outside surface of the torch and positioned as shown in FIGS. 1 and 2.

A cylindrical sleeve 170 is received into the annular opening 160 of the cylindrical support body 152. The cylindrical sleeve 170 is preferably formed of anodized aluminum to form a light-weight, but strong structure that is resistant to corrosion. The sleeve 170 extends in spaced relation along the front end of the torch body to define an annular air chamber 172 extending along the front end and forming an annular outlet opening 174 positioned adjacent the nozzle. O-rings 176 help secure the sleeve to the support body 122.

As illustrated, at least one air channel orifice 180 extends from the diametrically enlarged portion through the cylindrical support body 162 and the cylindrical sleeve 170. The air channel orifice 180 terminates at the annular air chamber 172 and allows a high velocity gas to be injected into the annular air chamber in swirling relation downward along the front end of the torch body and through the outlet opening 174 for generating an evenly formed protective air curtain. An air fitting 182 is mounted on the diametrically enlarged portion of the cylindrical support body 152 and communicates with the air channel orifice 180. Standard air lines 183 (FIG. 2) screw into the air fitting 182 and provide a source of high velocity gas. An enlarged first air plenum 184 is defined between the cylindrical sleeve 170 and the inner surface of the cylindrical support body 152. Thus, high velocity gas is first injected into the first air plenum 184 before passing into the second air plenum 186.

In a preferred embodiment, the gas is distributed into the first plenum chamber 184 and then flows through a plurality of evenly spaced orifices 180 that extend tangentially into a second plenum chamber 186. The tangentially inclined orifices provide a swirling gas flow within the plenum chamber 186. The high velocity gas swirls downward through the annular air channel 172 and is discharged through the outlet 174 to form a protective air curtain for the plasma. Further details of the air curtain attachment and the described torch are found in commonly assigned patent application entitled "Plasma Arc Torch Used in Underwater Cutting", and filed on Nov. 27, 1991, now U.S. Pat. No. 5,194,715 which is hereby incorporated by reference into this patent application.

Figure 4:
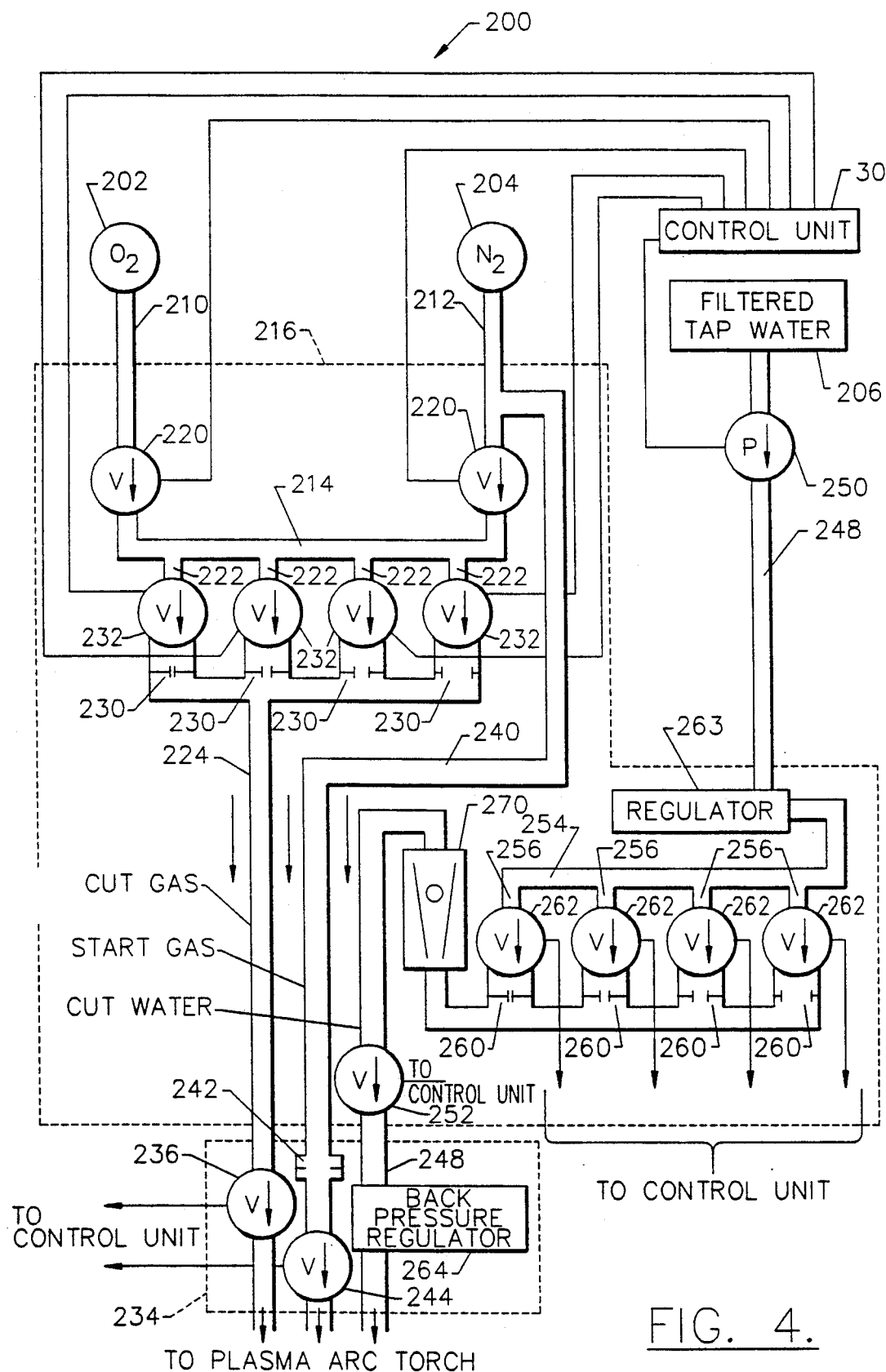
FIG. 4 is a schematic representation of the various water and gas control valves and associated metering orifices used in the present invention.

Referring now to FIG. 4, the water and gas metering system of the present invention is indicated generally at 200. In the illustrated embodiment each plasma arc torch of the system would include its own metering system. However, for purposes of description, only one metering system is described relative to one plasma arc torch.

The metering system 200 includes a source of oxidizing and nonoxidizing gases 202, 204, which in the present embodiment are oxygen and nitrogen, and a source of filtered tap water 206. The nitrogen and oxygen are used for generating the source of cutting gas, while the tap water may be used as both a source of water for the annular jet of protective water, and the cooling water flowing through various cooling circuits of the plasma arc torch.

An oxygen gas flow line 210 and nitrogen gas flow line 212 extend into a common header 214 positioned within a flow control housing 216. The flow control housing 216 is positioned remote from the frame 12, and usually close to the control unit 30 to facilitate access by an operator. In some embodiments, the control unit 30 can be an integral part of the flow control housing 216.

Each gas flow line 210, 212 includes a standard gas solenoid valve 220 on the upstream side of the header 214. Each gas solenoid valve 220 is operatively connected to the control unit 30 to allow automatic on-off control of the gas flowing into the header 214.

As illustrated, the gas flow lines extend into the common header 214, and four gas lines 222 extend from the common header 214 and merge into one cutting gas line 224. Each line off the header 214 includes a metering orifice 230 of predetermined size. Gas solenoid valves 232 are positioned within the lines 222 between the header 214 and metering orifice 230. Each gas solenoid valve 232 is operatively connected to the control unit 30.

The metering orifices 230 may be formed on a block or other support mounted within the housing 216 to form a parallel bank of metering orifices 230 through which the gas may pass therethrough. In one preferred embodiment, the bank of metering orifices 230 are dimensioned in increasing diameter across the bank to allow a flow increase through each orifice of about 20 cubic feet per hour. In one embodiment, the four metering orifices have respective diameters allowing gas flows of 20, 40, 60 and 80 cubic feet per hour. Thus, the total amount of gas flow through the cutting gas line 234 is dependent upon which gas solenoid valves are actuated and opened to allow gas flow. Although only four metering orifices are used, any number of orifices of predetermined size may be used.

The cutting gas line 224 exits the flow control housing 216 and passes into a plumbing box 234 positioned adjacent the plasma arc torch on the carriage 20 or bridge 18. The cutting gas line 224 is flexible and has enough line to allow movement of the bridge 18 and carriage 20 without damaging the line 224. A second gas solenoid valve 236 is positioned within the plumbing box 234 within the gas line 224. The gas solenoid valve 236 is operatively connected to the control unit 30. The position of the valve 236 is advantageous because the valve 236 is positioned in close proximity to the plasma arc torch, and may be used as a final on-off switch for gas flow. The valve 236 may be actuated, and because the valve is positioned closer to the torch than the metering orifices 230 and gas solenoid valves 232 associated therewith, a cutting gas Will readily pass into the torch if the other gas solenoid valves 232 within the flow control housing 216 are actuated.

A starting gas flow line 240 branches from the nitrogen line upstream of the header 214 and extends to the plumbing box 234. Within the plumbing box, the starting gas flow line 240 includes a metering orifice 242 and gas solenoid valve 244 operatively connected to the control unit 30 to provide on-off control of nitrogen flow. The metering orifice 242 is dimensioned to provide a desired amount of nitrogen gas flow within the plasma arc torch during starting. Because the starting gas solenoid valve 244 is positioned within the plumbing box 234, when the control unit 30 actuates the starting gas solenoid valve 244, an undelayed starting flow of nitrogen is begun. Any prolonged delay in gas flowing to the torch could result in torch damage if the arc is generated and the starting gas has not yet reached the plasma arc torch.

In one preferred starting method, a flow of nitrogen is generated to the plasma arc torch 22. The gas enters the plenum chamber in a swirling fashion and flows outwardly therefrom through the arc constricting coaxial bores of the nozzle assembly. A pilot arc is momentarily created between the discharge end of the electrode and the nozzle assembly and then transferred to the workpiece through the arc constricting bores respectively. While the pilot arc is transferred, the flow of non-oxidizing gas is substantially concurrently terminated. A new flow of oxidizing gas is directed into the passageway and through the gas baffle, into the gas plenum chamber and through the arc constricting coaxial bores of the nozzle assembly. The transferred arc and the oxidizing gas create a plasma gas flow between the electrode, through the nozzle assembly, and to the workpiece. Each arc constricting bore contributes to the intensification and collimation of the arc.

Water discharged into the passageway directs the injection of water into the nozzle assembly where it is converted into a swirling vortex for surrounding the plasma arc. To terminate operation of the torch, the transferred arc is terminated while substantially concurrently terminating the flow of oxidizing gas. At the same time, a flow of nitrogen is generated between the discharge of the electrode and the nozzle assembly by directing the non-oxidizing gas, preferably nitrogen, into the passageway, and ultimately through the coaxial bore of the nozzle assembly. A method of starting and continuing operation of the plasma arc torch is described further in U.S. Pat. No. 5,017,752, assigned to the present assignee, ESAB Welding Products, Inc.

Referring once again to FIG. 4, the various metering controls for regulating water flow to the plasma arc torch are shown. The illustrated embodiment shows the metering system used with a water line 248 carrying water to the torch. The system could also be applied to the conventional cooling circuit of a plasma arc torch. A water pump 250 draws water from the source of filtered tap water 206 and through a flow control valve 252 positioned within the water line 248 to provide on-off control of water flow from the source of tap water into the flow control housing 216. The flow control valve is preferably electrically actuated, similar to an electric solenoid valve.

The water line 248 flows into a common header 254. The header 254 has four branch lines 256. Each branch line 256 includes a metering orifice 260 which together are positioned in a parallel bank and receive the pumped water therethrough. A water solenoid valve 262 is positioned within each branch line 256 and is operatively connected to the control unit 30 to provide on-off control of water through the metering orifices 260. The metering orifices vary in dimension, and as with the gas metering orifices, the number and size can vary. Because the water is not a compressible fluid, the upstream and downstream pressures across the metering orifices 260 must be controlled with regulators. An upstream regulator 263 is positioned within the fluid control housing 216. An adjustable back pressure regulator 264 is positioned in the plumbing box 234 and maintains a water filled hose between the plumbing box 234 and the flow control housing 216. The two regulators 263, 264 ensure that the desired pressure across the metering orifices 260 is maintained.

While precisely set and matched regulators for upstream and downstream pressure could be used within the system, one adjustable back pressure regulator is more economical. Instead of a pressure gauge to determine pressure for adjusting the back pressure regulator, a flowmeter 270 is inserted in the water line of the plumbing box 234. During system operation, the operator visually reads the flowmeter and adjusts the back pressure regulator 264 to create the desired pressure differential across the metering orifices 260. The control unit 30 is preset and actuates selected water solenoid valves 262 for allowing a predetermined amount of water to pass through the metering orifices 260. Which actuator valves are selected depends on the torch design, cutting current, plate thickness, distance from the nozzle to the plate and other process parameters.

In the present system, the flow control valve 252 is a conventional, electrically controlled valve such as a solenoid valve. The valve 252 of the present invention includes means for sensing whether water is present in the valve, and whether the valve is open. The type of valve used in the system 10 may vary as long as the valve includes those sensors for testing the presence of fluid and the open or closed condition of the valve.

Figure 6:
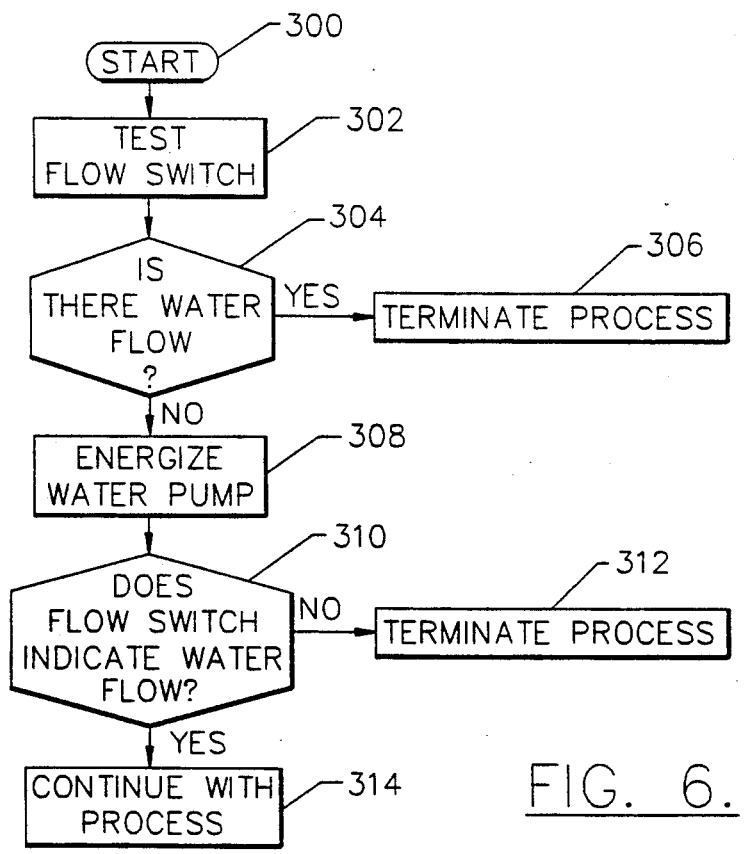
FIG. 6 is a flow chart depicting the various steps for controlling the starting of a plasma arc cutting and welding system in which a flow control valve is tested.

The sensing means of the flow control valve allows some control over the starting of the plasma arc cutting and welding system. FIG. 6 illustrates a flow chart of a method of the present invention which provides some control over the starting process to ensure that the initial water flow pumped from the source of tap water is stable and the valve 252 is not closed or electrically bypassed. At the start of system operation 300, the fluid control valve 252 is tested 302 to determine if the valve is open to allow water flow through the valve. Testing occurs when the control unit 30 generates a signal to the sensing means to sense 1) present of water and 2) the valve condition. If the valve is closed, the control unit 30 terminates startup for the system 10. If the valve is open, the valve is tested again 304 to determine if water is present within the valve. If water is present, the control unit 30 terminates system startup 306 because water should not be present before the water pump energization. If water is not present, the pump is energized 308. The valve is tested again for water 310. If water is present, the system startup continues 314; otherwise, the control unit 30 terminate the starting process 312.

The present method for controlling the startup of the cutting and welding system by testing the fluid control valve 252 both for an open condition and the presence of water is an improvement over prior systems in which an operator could electrically bypass the valve so that the control unit could not activate the valve into opened or closed positions. As a result, the operator may operate the system without water flow to the torch, causing overheating and possible burnup of the torch. The present startup control method also provides added safety necessary to protect the cutting and welding systems from the delays and added costs occurring from replacing damaged torches and other components.

Figure 5:
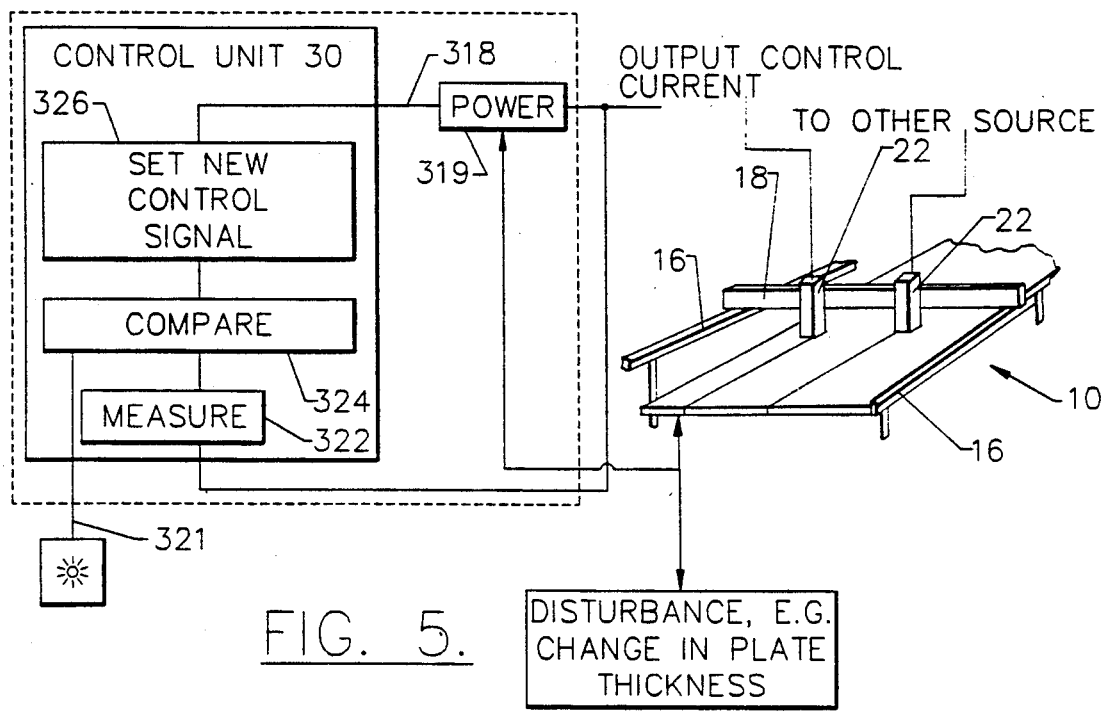
FIG. 5 is a schematic representation of the control system and power supply for controlling the cutting current generated to the plasma arc torch.

Referring now to FIG. 5, a schematic of the method used for controlling the current generated to a plasma arc torch cutting and welding system is shown in detail. A power supply outputs a constant cutting current to the plasma arc torches of the cutting system. An example of such a power supply is an ESP-400 power supply manufactured by ESAB Welding Products, Inc. of Florence, S.C.

In the power supply, the cutting current is precisely regulated by an analog reference voltage signal 318. The cutting current is a linear function of the analog reference voltage signal. In a prior art system, the analog signal is adjusted by turning a small control knob, which varies the analog signal and varies the cutting current. During some welding and cutting operations, process parameters such as the thickness of the plate, the distance from the nozzle to the plate, and temperature considerations change. As a result, the cutting current may vary as the process parameters change, and the operator must adjust the control knob to maintain a constant current output to the torch. Constant operator adjustment may result in some operator error, and the loss of cut or weld quality.

The method of the present invention provides for a feedback loop electrical circuit within the overall cutting and welding system. In accordance with present method, the cutting current is measured 322, and the cutting current is compared at to a predetermined value 324 representative of the desired cutting current. An analog voltage control signal is generated corresponding to a predetermined value of the desired cutting current 326. As a result, the cutting current is varied by the newly generated analog voltage control signal so that a constant cutting current is generated.

Figure 7:
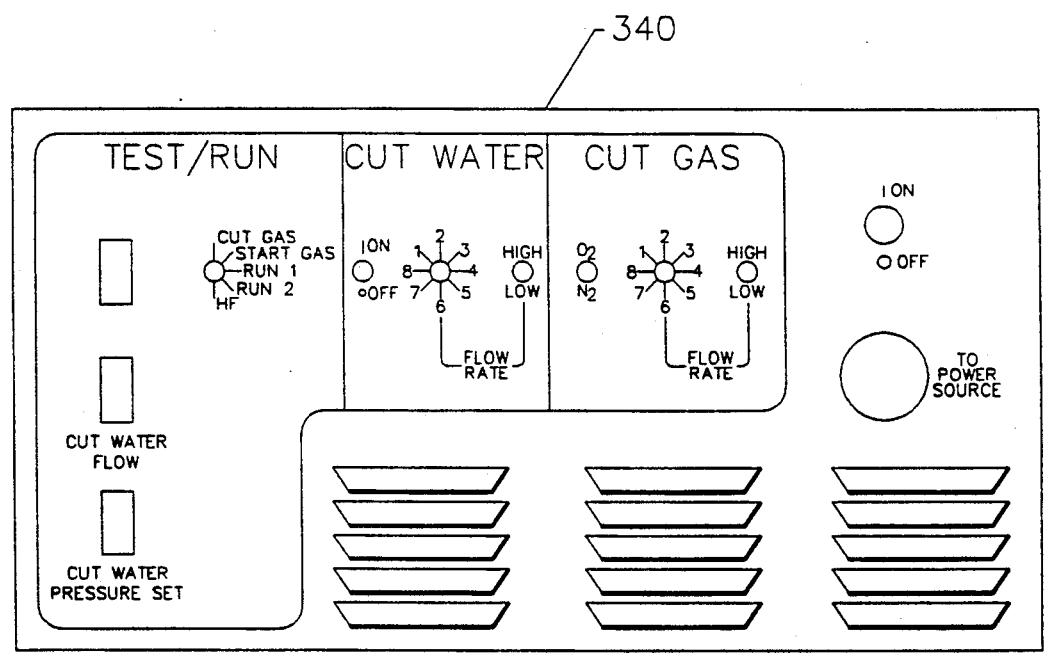
FIG. 7 is a view of the front panel of a control unit used in the present invention.

Referring now to FIG. 7, a proposed cover plate 340 for the control unit is shown. In the illustrated embodiment, the flow control housing and control unit are fabricated together in one housing. Because the metering system and other control systems are more centralized, the cut gas and cut water may easily be controlled at one location. The cut water an cut gas are quantified in numerical ascending order on the cover plate 340. The numerical gas flow quantifications could be expressed in cubic feet per hour or other desired designations.

The system of the present invention provides for more efficient control over the amount of gas and water which flows into the plasma arc torches 22 of the invention without having complex feedback loop controls and expensive valve technology. The control unit 30 actuates selected solenoid valves to provide the desired amount of water and gas flowing into the torch. The microprocessor of the control unit may be preprogrammed to actuate selected solenoid valves at prearranged times during cutting or welding to change the amount of water or gas flowing into the torch as needed. The method of starting system operation by checking the flow control valve 252 ensures that an operator cannot electrically bypass the valve when the valve is closed.

In the drawings and specifications, there has been set forth a preferred embodiment of the invention, and although specific terms are employed, they are used in a generic and descriptive sense only and not for purposes of limitation.

That which is claimed is:

1. A cutting and welding system having at least one plasma arc cutting and welding torch, and a metering system for controlling at a location remote from the plasma arc torch the amount of gas fed to the plasma arc torch comprising a plasma arc torch which includes an electrode having an arc discharge end, a nozzle assembly positioned adjacent the discharge end of the electrode and a bore extending through the nozzle assembly, means for creating an electrical arc extending from the electrode through the bore to a workpiece located adjacent the nozzle assembly, and means for generating a flow of gas between the electrode and the nozzle assembly to create a plasma flow through the bore to a workpiece positioned beneath the nozzle assembly, gas flow means communicating with a source of gas and the plasma arc torch for supplying gas to the torch, a plurality of metering orifices positioned within the gas flow means in a parallel bank to each other so that the gas may flow through each of the metering orifices, each metering orifice having a predetermined diameter opening, with at least two of the metering orifices being sized differently from each other so as to have different flow capacities, and a gas control valve mounted adjacent each of the metering orifices, and wherein each gas control valve has open and closed positions for allowing gas flow through the associated metering orifice upon actuation of the gas control valve into an open position, and control means operatively connected to the gas control valves for actuating selected gas control valves to control gas flow through selected metering orifices to allow a predetermined amount of gas to flow into the plasma arc torch, wherein the amount of gas flowing to the torch may be accurately controlled by actuating selected gas control valves to allow gas flow only through selected metering orifices of a desired size.

2. The cutting and welding system according to claim 1 including means supporting the torch in spaced relation above the workpiece, said support means including means for moving the torch along the support means for welding or cutting of the workpiece along a predetermined path of travel.

3. The cutting and welding system according to claim 1 wherein at least three of the metering orifices are provided and which are dimensioned so as to have increasing diameters respectively.

4. The cutting and welding system according to claim 3 wherein the gas control valves comprise gas solenoid valves which are positioned within the gas flow means on the upstream side of the associated metering orifice.

5. The cutting and welding system according to claim 1 includes a plurality of plasma arc torches, and including separate gas flow means communicating with each torch and the source of cutting gas, and wherein each gas flow means includes a bank of metering orifices and gas control valves, wherein said gas control valves are each connected to said control means.

6. The cutting and welding system according to claim 1 including a control housing positioned remotely from the plasma arc torches and being readily accessible to an operator of the cutting and welding system, and wherein the bank of metering orifices and the gas control valves are mounted within the control housing.

7. The cutting and welding system according to claim 6 wherein the control means is positioned within the control housing.

8. The cutting and welding system according to claim 1 wherein said control means comprises a microprocessor.

9. The cutting and welding system according to claim 1 wherein the source of cutting gas includes a source of nonoxidizing gas and a source of oxidizing gas, and wherein the gas flow means includes a common header communicating with the gas control valves and metering orifices, a first gas flow line extending between the nonoxidizing gas source and the header, and a second gas flow line extending between the oxidizing gas source and the header.

10. The cutting and welding system according to claim 9 including starting gas flow means extending from the nonoxidizing gas source to the plasma arc torch for supplying a starting flow of nonoxidizing gas, and including a metering orifice and starting gas control valve positioned within the starting gas flow means, and wherein the starting gas control valve is operatively connected to said control means for selecting on-off flow of nonoxidizing starting gas into the plasma arc torch.

11. The cutting and welding system according to claim 10 wherein the starting gas control valve and the metering orifices are positioned adjacent to the plasma arc torch to start an undelayed gas flow into the plasma arc torch when the starting gas control valve is initially opened.

12. The cutting and welding system according to claim 11 wherein the control means actuates the starting gas control valve and the other gas control valves associated with the metering orifices in a predetermined order to generate a first gas flow consisting essentially of a non-oxidizing starting gas into the plasma arc torch, then a second gas flow of oxidizing cutting gas into the plasma arc torch after the flow of the nonoxidizing gas into the plasma arc torch is terminated.

13. The cutting and welding system according to claim 9 including a gas control valve means positioned within each of said first and second gas flow lines for allowing a flow of either nonoxidizing or oxidizing gas, or a combination of both, to said header.

14. The cutting and welding system according to claim 1 wherein the plasma arc torch includes means for generating an annular jet of fluid outward from the nozzle to envelope the plasma as it is discharged from the nozzle, and including fluid flow means communicating with a source of fluid and the plasma arc torch for providing a fluid flow path to the plasma arc torch, a plurality of metering orifices positioned within the fluid flow means in a parallel bank to each other so that fluid may flow through each of the metering orifices, each metering orifice having a predetermined diameter opening, and a fluid control valve mounted adjacent each of the metering orifices on the upstream side toward the supply of fluid, wherein each fluid control valve has open and closed positions for allowing fluid flow through a metering orifice upon actuation of the fluid control valve.

15. The cutting and welding system according to claim 14 wherein the annular jet of fluid is a gas.

16. The cutting and welding system according to claim 1 wherein the annular jet of fluid is water, and including a back pressure regulator positioned within the fluid flow means on the downstream side of the bank of metering orifices, and an upstream regulator positioned within the fluid flow means on the upstream side of the metering orifices for controlling the upstream and downstream water pressures across the metering orifices.

17. The cutting and welding system according to claim 16 including a plumbing box mounted adjacent to the plasma arc torch and wherein the back pressure regulator is mounted within the plumbing box.

18. The cutting and welding system according to claim 16 including a flowmeter positioned between the bank of metering orifices and the back pressure regulator for measuring the amount of flowing liquid, and wherein the back pressure regulator is adjustable for regulating a desired pressure differential.

19. The cutting and welding system according to claim 14 including an electrically operated flow control valve mounted within the fluid flow means for controlling on-off flow of fluid to the metering orifices and associated fluid control valves, and wherein said flow control valve includes means for sensing fluid within the valve, and wherein said sensing means and flow control valve are operably connected to said control means for controlling on-off flow of fluid to the plasma arc torch in response to sensed conditions of fluid within the valve.

20. The cutting and welding system according to claim 19 wherein the means for sensing fluid with the valve includes means for sensing an open valve condition.

21. The cutting and welding system according to claim 1 wherein the means for creating an electrical arc extending from the electrode through the bore includes a power supply having a cutting current output dependent upon an analog voltage control signal generated by said control means, and including feedback closed loop circuit means for delivering a signal representative of the outputed cutting current to said control means, and wherein said control means includes means for comparing the received signals with a predetermined standard and means for changing the analog control signal to maintain a constant output cutting current.

22. A cutting and welding system having at least one plasma arc cutting and welding torch, and a metering system for controlling at a location remote from the plasma arc torch the amount of gas and water fed to the plasma arc torch, comprising a plasma arc torch which includes an electrode having an arc discharge end, a nozzle assembly positioned adjacent the discharge end of the electrode and a bore extending through the nozzle assembly, means for creating an electrical arc extending from the electrode through the bore to a workpiece located adjacent the nozzle assembly, means for generating a flow of gas between the electrode and the nozzle assembly to create a plasma flow outwardly through the bore to a workpiece positioned beneath the nozzle assembly, and means for generating an annular jet of water outward from the nozzle to envelope the plasma as it is discharged from the nozzle, means supporting the torch in spaced relation above the workpiece, said support means including means for moving the torch along the support means for welding or cutting of the workpiece along a predetermined path of travel, gas flow means communicating with a source of gas and the plasma arc torch for supplying gas to the torch, water flow means communicating with a source of water and the plasma arc torch for supplying water to the torch, a plurality of metering orifices positioned in a parallel bank within respective gas and water flow means so that the gas and water may flow through each of the metering orifices, each metering orifice having a predetermined diameter opening, and a control valve mounted adjacent each of the metering orifices within the respective gas and water flow means on the upstream side toward the supplies of gas and water, wherein each control valve has opened and closed positions for allowing gas and water to flow through a metering orifice upon actuation of the control valves, and control means operatively connected to the control valves for actuating selected control valves to control the gas and water flow through selected metering orifices to allow a predetermined amount of gas and water to flow to the plasma arc torch, wherein the amount of gas and water flowing to the torch may be accurately controlled by actuating selected control valves to allow gas and water flow only through selected metering orifices of a desired size.

23. The cutting and welding system according to claim 22 including a control housing positioned remote from the support means and positioned to be readily accessible to an operator of the cutting and welding system, and wherein the plurality of metering orifices are positioned within the control housing.

24. The cutting and welding system according to claim 22 wherein the control means is positioned within the control housing.

25. The cutting and welding system according to claim 22 wherein the metering orifices are dimensioned in increasing diameter within the bank.

26. The cutting and welding system according to claim 22 wherein the control valves comprise solenoid valves.

27. The cutting and welding system according to claim 22 including a plurality of plasma arc torches positioned on said support means, and including separate gas and water flow means communicating with respective sources of gas and water, and wherein each gas and water flow means includes a bank of metering orifices and control valves each connected to said control means for selectively controlling the amount of gas and water flowing into each plasma arc torch.

28. The cutting and welding system according to claim 22 wherein the control means comprises a microprocessor.

29. The cutting and welding system according to claim 22 wherein the source of gas includes a source of nonoxidizing gas and a source of oxidizing gas, and wherein the gas flow means includes a common header communicating with the nonoxidizing and oxidizing gas sources, and the control valves and metering orifices.

30. The cutting and welding system according to claim 29 including a starting gas flow means extending from the nonoxidizing gas source to the plasma arc torch for supplying a starting flow of nonoxidizing gas, and including a metering orifice and gas control valve positioned within the starting gas flow means, and wherein the starting gas control valve is operatively connected to said control means for selecting off-on flow of nonoxidizing starting gas into the plasma arc torch.

31. The cutting and welding system according to claim 30 wherein the starting gas control valve and the metering orifice are mounted on the support means adjacent to the plasma arc torch to start an undelayed gas flow into the plasma arc torch when the starting gas control valve is initially opened.

32. The cutting and welding system according to claim 30 wherein the control means actuates the starting gas control valve and starting gas control valves in a predetermined order to generate a first flow consisting essentially of a non-oxidizing starting gas into the plasma arc torch, and then a second flow of oxidizing cutting gas into the torch after the flow of the nonoxidizing gas is terminated.

33. The cutting and welding system according to claim 30 including gas control valve means positioned within the gas flow means between the header and the sources of nonoxidizing and oxidizing gas for allowing a flow of either nonoxidizing or oxidizing gas, or a combination of both.

34. The cutting and welding system according to claim 22 including a back pressure regulator positioned within the water flow means on the downstream side of the bank of metering orifices, and an upstream regulator positioned within the water flow means on the upstream side of the metering orifices for controlling the upstream and downstream water pressures across the metering orifices.

35. The cutting and welding system according to claim 34 including a flowmeter positioned between the bank of metering orifices and the back pressure regulator for measuring the flow of water, and wherein the back pressure regulator is adjustable for regulating a desired pressure differential.

36. The cutting and welding system according to claim 34 including an electrically operated flow control valve mounted within the water flow means for controlling off-on flow of water to the metering orifices and associated water control valves, and wherein said flow control valve includes means for sensing whether water is present within the valve, means for sensing whether the valve condition is open or closed, and wherein said sensing means and flow control valve are operably connected to said control means for controlling off-on flow of water to the plasma arc torch in response to sensed conditions of water and valve condition within the valve.

37. The cutting and welding system according to claim 22 wherein said means for creating an electrical arc extending from the electrode through the bore includes a power supply having a cutting current output dependent upon an analog voltage control signal generated by said control means, and including feedback closed loop circuit means for delivering a signal representative of the output cutting current to said control means, and wherein said control means includes means for comparing the received signals with a predetermined standard and for changing the analog voltage control signal to maintain a constant output cutting current.

38. A method of controlling the current generated to a plasma arc torch cutting and welding system comprising the steps of
generating a predetermined cutting current form a power supply to an electrode of a plasma arc torch having an arc discharge end and a nozzle assembly positioned adjacent the discharge end of the electrode, and which includes a bore extending through the nozzle assembly, while also
generating a flow of gas between the electrode and the nozzle assembly to create a plasma arc flow through the bore to a workpiece positioned beneath the nozzle assembly,
controlling the cutting current generated to the electrode with an analog voltage control signal in which the value of the cutting current is linearly dependent upon the value of the analog voltage control signal,
measuring the cutting current,
comparing the cutting current to a predetermined value, and
generating an analog voltage control signal corresponding to the predetermined value of the desired cutting current when the cutting current varies from the predetermined value so that a constant cutting current is generated.

39. A method of controlling the starting of a plasma arc cutting and welding system in which the system includes at least one plasma arc torch, gas and fluid flow circuits for supplying gas and fluid to the plasma arc torch, means for generating a flow of gas between the electrode and the nozzle assembly of the torch to create a plasma arc flow outwardly to a workpiece positioned beneath the torch nozzle, means for generating an annular jet of fluid outward from the nozzle to envelope the plasma as it is discharged from the nozzle, a plurality of metering orifices and associated fluid control valves positioned within each of the flow circuits for metering the fluid and gas flow through the channels, each fluid circuit also having a flow control valve positioned upstream of the metering orifices and associated valves for allowing on-off flow of fluid to the metering orifices and associated valves, comprising the steps of
testing a flow control valve to determine if the flow control valve is open to allow fluid flow therethrough,
energizing a fluid pump used to pump fluid from the source of fluid through the flow control valve if the switch is determined to be open, and
determining if fluid is present within the fluid control valve, and maintaining system operation and pumping action of flow is sensed within the flow control valve.

40. The method according to claim 39 including the step of terminating system operation if the valve is determined to be closed at any time.

41. The method according to claim 39 including the step of terminating system operation if the fluid control valve has fluid when the valve is initially tested.

42. The method according to claim 39 including the step of terminating system operation when the fluid control valve is determined to have fluid before the fluid pump is energized.

43. The method according to claim 39 wherein the annular jet of fluid is water.

44. The method according to claim 39 wherein the annular jet of fluid is a gas.

45. An apparatus of controlling the current generated to a plasma arc torch cutting and welding system comprising means for generating a predetermined cutting current from a power supply to an electrode of a plasma arc torch having an arc discharge end and a nozzle assembly positioned adjacent the discharge end of the electrode, and which includes a bore extending through the nozzle assembly, means for generating a flow of gas between the electrode and the nozzle assembly to create a plasma flow through the bore to a workpiece positioned beneath the nozzle assembly, means for controlling the cutting current generated to the electrode, said control means including means for generating an analog voltage control signal in which the valve of the controlled cutting current is dependent upon the valve of the analog voltage control signal, means for measuring the cutting current, means for comparing the cutting current to a predetermined valve, and means for generating an analog voltage control signal corresponding to the predetermined valve of the desired cutting current when the cutting current varies from the predetermined valve so that a constant cutting current is generated.

46. In a plasma arc cutting and welding system in which the system includes at least one plasma arc torch, gas and fluid circuits for supplying gas and fluid to the plasma arc torch, means for generating a flow of gas between the electrode and the nozzle assembly of the torch to create a plasma arc flow outwardly to a workpiece positioned beneath the torch nozzle, means for generating an annular jet of fluid outward from the nozzle to envelope the plasma as it is discharged from the nozzle, and a plurality of metering orifices and associated fluid control valves positioned within each of the flow circuits for metering the fluid and gas flow through the channels, each fluid circuit also having a flow control valve positioned upstream of the metering orifices and associated valves for allowing on-off flow of fluid to the metering orifices and associated valves, an apparatus for controlling the starting of the cutting and welding system, comprising means for testing a flow control valve to determine if the flow control valve is open to allow fluid flow therethrough, means for energizing a fluid pump used to pump fluid from the source of fluid through the flow control valve if the switch is determined to be open, and means for determining if fluid is present within the flow control valve, and means for maintaining system operation if fluid flow is sensed within the flow control valve.

* * * * *

UNITED STATES PATENT AND TRADEMARK OFFICE
CERTIFICATE OF CORRECTION

PATENT NO. : 5,290,995
DATED : March 1, 1994
INVENTOR(S) : Higgins, et al.

It is certified that error appears in the above-identified patent and that said Letters Patent is hereby corrected as shown below:

Column 18, lines 5-31 and column 45, lines 5-31:
  Cancel Claims 38 and 45.

Signed and Sealed this

Eleventh Day of July, 1995

Attest:

BRUCE LEHMAN

Attesting Officer        Commissioner of Patents and Trademarks